US006907010B2

United States Patent
Zhang

(10) Patent No.: US 6,907,010 B2
(45) Date of Patent: Jun. 14, 2005

(54) DYNAMIC RADIO LINK ADAPTATION FOR INTERFERENCE IN CELLULAR SYSTEMS

(75) Inventor: Guodong Zhang, Patchogue, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 177 days.

(21) Appl. No.: 10/322,161

(22) Filed: Dec. 18, 2002

(65) Prior Publication Data

US 2004/0203402 A1 Oct. 14, 2004

Related U.S. Application Data

(60) Provisional application No. 60/418,386, filed on Oct. 11, 2002.

(51) Int. Cl.[7] .............................................. H04L 12/26
(52) U.S. Cl. ...................................... 370/252; 455/522
(58) Field of Search ........................... 455/63, 62, 67.1, 455/522, 69, 436, 439, 276, 456.1; 370/252, 311–318, 335–342, 276, 280, 332, 356, 396, 238.1, 254

(56) References Cited

U.S. PATENT DOCUMENTS

| | | | |
|---|---|---|---|
| 6,392,572 B1 | | 5/2002 | Shiu et al. |
| 6,510,146 B1 | * | 1/2003 | Korpela et al. .............. 370/332 |
| 6,564,067 B1 | * | 5/2003 | Agin ........................... 455/522 |
| 6,622,024 B2 | * | 9/2003 | Koo et al. .................... 455/522 |
| 6,640,105 B1 | | 10/2003 | Shin |
| 6,661,777 B1 | * | 12/2003 | Blanc et al. ................. 370/252 |
| 6,671,514 B1 | * | 12/2003 | Cedervall et al. ......... 455/456.1 |
| 6,675,016 B2 | * | 1/2004 | Lucidarme et al. ....... 455/452.2 |
| 6,725,039 B1 | * | 4/2004 | Parmar et al. .............. 455/436 |
| 6,747,958 B2 | * | 6/2004 | Vayanos et al. ............ 370/252 |

* cited by examiner

*Primary Examiner*—Chi Pham
*Assistant Examiner*—Prenell Jones
(74) *Attorney, Agent, or Firm*—Volpe and Koenig, P.C.

(57) ABSTRACT

A dynamic link adaptation technique employed in a cellular system by a user equipment (UE) having two coded composite transport channels (CCTrCHs) in an uplink time slot begins by estimating transmit power using a transport format combination (TFC) pair for the CCTrCHs. The total estimated transmit power for two CCTrCHs is compared with a given threshold. The use of both TFCs is permitted when the total estimated power is less than the threshold. A power of each TFC is compared with the threshold and the TFC whose estimated power is greater than the threshold is blocked. A medium access control (MAC) is advised that one TFC is blocked, and the MAC notifies a codec associated with the TFC whose estimated power is less than that threshold to reduce the data rate when applicable.

26 Claims, 1 Drawing Sheet

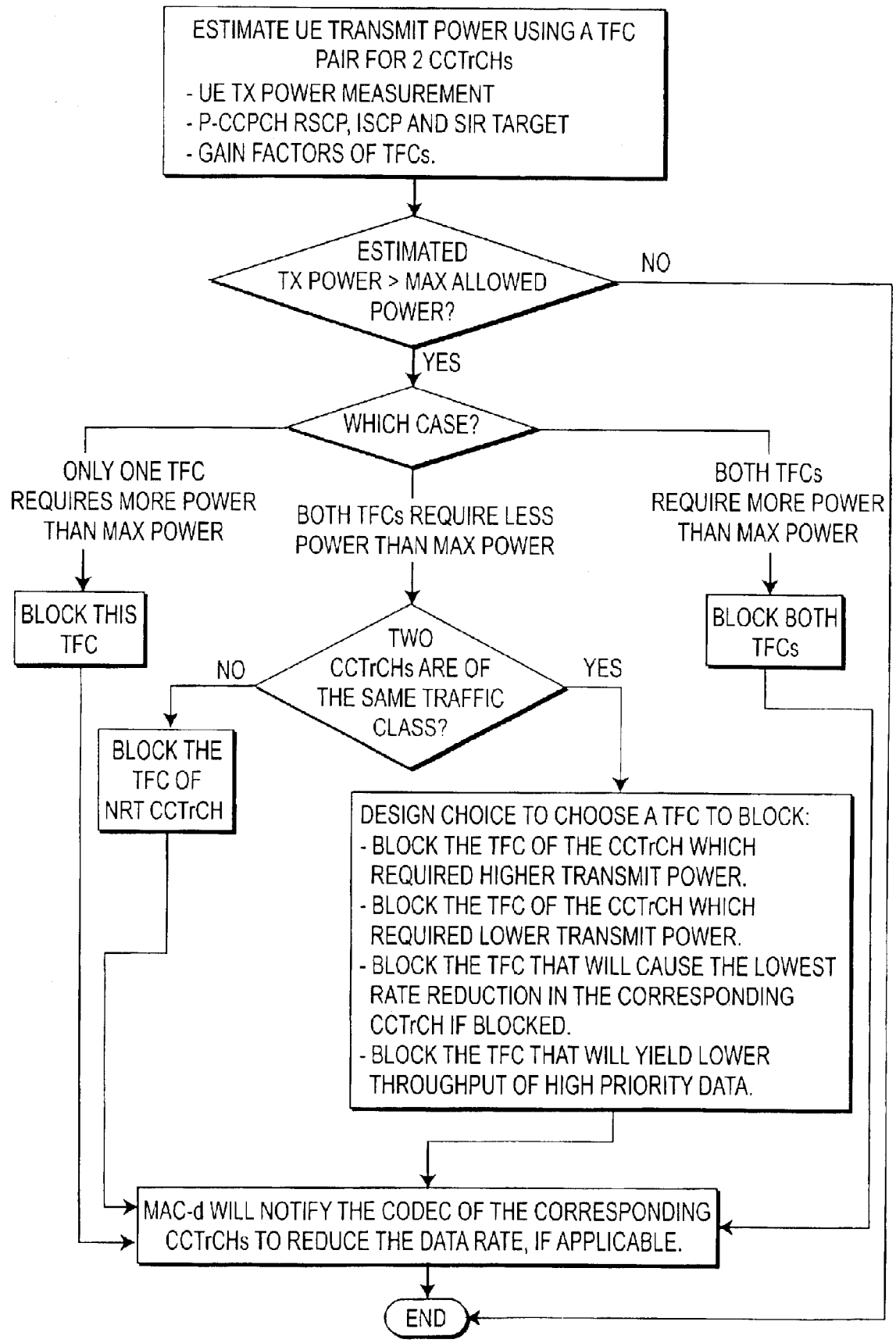

DYNAMIC RADIO LINK ADAPTATION FOR INTERFERENCE IN CELLULAR SYSTEMS

CROSS REFERENCE TO RELATED APPLICATION(S)

This application claims priority from U.S. provisional application No. 60/418,386 filed on Oct. 11, 2002, which is incorporated by reference as if fully set forth.

FIELD OF INVENTION

This invention generally relates transport format combination (TFC) selection, and more particularly to a technique enabling a user equipment (UE) to make a TPC selection employing dynamic link adaptation (DLA).

BACKGROUND

| | |
|---|---|
| CCPCH | common control physical channel |
| CCTrCH | coded composite transport channel |
| ISCP | interference signal code power |
| MAC | medium access control |
| NRT | non-real time |
| RSCP | received signal control power |
| RT | real time |
| SIR | signal to interference ratio |
| TDD | time-division duplex |
| TFC | transport format combination |
| TX | transmission |
| UE | user equipment |
| UMTS | universal mobile telecommunications system |

For UMTS-TDD systems, in an uplink time slot where the UE has only one CCTrCH, the UE TX power is the TX power of the CCTrCH, which is determined by the TFC used for this CCTrCH. As specified in the standards, when the UE estimates that a certain TFC would require more power than the maximum transmitter power, it should limit the usage of that TFC. The UE continuously evaluates which TFCs can be used for the purpose of TFC selection. The evaluation is performed using the estimated UE transmit power of a given TFC. MAC-d will notify the codec to reduce the data rate, if applicable, by sharing the information as to which TFCs can be used. This is called dynamic link adaptation (DLA).

However, in an uplink time slot where the UE has two CCTrCHs, the UE TX power is the sum of the TX power of the two CCTrCHs. That is, UE TX power is determined jointly by the TFCs of the two CCTrCHs. The current standardized dynamic link adaptation (DLA) algorithm cannot deal with this case, i.e., the UE does not know which TFCs to use or block.

It is desirable to provide a method of enabling a UE to make a decision regarding TFC selection by using dynamic link adaptation (DLA).

SUMMARY

The invention provides a method of dynamic radio link adaptation in the presence of variable interference conditions in cellular systems. The invention offers a solution to perform dynamic link adaptation properly when the UE has two CCTrCHs in an uplink time slot. The invention also provides details of the preferred implementation, and strategies and algorithms by which cellular networks can dynamically adapt a radio link according to the change of interference. In particular, it is applicable to UMTS-TDD systems. It is to be noted that this invention is applicable to UMTS-FDD, CDMA-2000 and other systems as well.

BRIEF DESCRIPTION OF THE DRAWING(S)

A more detailed understanding of the invention may be had from the following description of a preferred embodiment, given by way of example and to be understood in conjunction with the accompanying drawing wherein:

FIG. 1 is a flow diagram of the process steps for a preferred embodiment of the present invention.

DETAILED DESCRIPTION OF THE PREFERRED EMBODIMENT(S)

An implementation of an exemplary interpolator algorithm for dynamic link adaptation for CDMA cellular systems is set forth below. The exemplary dynamic link adaptation algorithm takes into account that the UE has two CCTrCHs in an uplink time slot, and includes the following:

1) The combination of a TFC used by the first CCTrCH and a TFC used by the second CCTrCH is defined as the TFC pair of the UE that has two CCRrCHs in one time slot. When the UE (physical layer) estimates that a certain TFC pair would require more power than the maximum transmitter power, the usage of that TFC pair is limited.

2) The UE will decide as to which TFCs can be used for each CCTrCH based on the following:
   a. The traffic class (RT or NRT) of the CCTrCH,
   b. The required transmit power for a TFC of a CCTrCH,
   c. Physical resource allocation information, and
   d. Priority of the logical channel.

The following is an example of the interpolator algorithm. A UE transmit power estimation will be made using the result of uplink power control (either the UE transmitted power measured over the last measurement period or the new TX power based on updated P-CCPCH RSCP, ISCP or SIR target) and the gain factors of the corresponding TFC.

When the UE estimates that a certain TFC pair would require more power than the maximum transmitter power, it will check the required transmit power of each TFC of the corresponding CCTrCH in the TFC pair. The UE will process the TFC pair depending on the transmit power and traffic class.

If only the TFC of one CCTrCH requires more power than the maximum transmitter power, then this TFC will be blocked.

If the TFCs of both CCTrCHs require more power than the maximum transmitter power, then both TFCs will be blocked.

If TFCs of both CCTrCHs require less power than the maximum transmitter power but the sum of them requires more than the maximum transmitter power, the UE will choose to block one TFC based on traffic class.

If one CCTrCH is real-time (RT) and the other CCTrCH is non-real-time (NRT), the UE will block the TFC of NRT CCTrCH.

If both CCTrCHs are RT or NRT, the UE can choose to block a TFC based on the transmit power required by the TFC or physical resource allocation information. It is a design choice. The design choice includes the following alternatives:

Block the TFC of the CCTrCH requiring higher transmit power.

Block the TFC of the CCTrCH requiring lower transmit power.

Block the TFC that will cause the lowest rate reduction in the corresponding CCTrCH if blocked. This is determined by knowing the physical resource allocation of the CCTrCHs.

Block the TFC that will yield lower throughput of high priority data.

MAC-d will notify the codec of the corresponding CCTrCH(s) to reduce the data rate, if applicable, by sharing the information as to which TFCs can be used for each CCTrCH.

FIG. 1 illustrates the steps described above for a preferred embodiment of the process of the invention, and starts at the step of "estimating UE transmit power using a TFC pair for two CCTrCHs". After stringing through the intermediate steps shown, the process of the algorithm ends in "MAC-d notifying the codec of the corresponding CCTrCHs to reduce the data rate, if applicable".

While the foregoing description makes reference to UMTS-TDD systems as an example, it is to be noted that the invention is applicable to FDD and other systems as well. Modifications, which would be needed to render the inventive method suitable for UMTS-FDD, CDMA-2000, and other systems, are considered to be within the purview of the present invention.

What is claimed is:

1. A dynamic link adaptation technique employed in a cellular system by a user equipment (UE) having two coded composite transport channels (CCTrCHs) in an uplink time slot, comprising:

estimating transmit power using a transport format combination (TFC) pair for the CCTrCHs;

comparing total estimated transmit power for two CCTrCHs with a given threshold;

permitting use of both TFCs when the total estimated power is less than the threshold;

comparing a power of each TFC with said threshold;

blocking the TFC whose estimated power is greater than said threshold;

advising a medium access control (MAC) that one TFC is blocked; and said MAC notifying a codec associated with the TFC whose estimated power is less than said threshold to reduce the data rate when applicable.

2. A dynamic link adaptation technique employed in a cellular system by a user equipment (UE) having two coded composite transport channels (CCTrCHs) in an uplink time slot, comprising:

estimating transmit power using a transport format combination (TFC) pair for the CCTrCHs;

comparing total estimated transmit power for two CCTrCHs with a given threshold;

permitting use of both TFCs when the total estimated power is less than the threshold;

comparing the estimated power of each TFC with said threshold;

determining if the CCTrCHs are of a same traffic class when each of the TFCs is less than said threshold; and blocking the TFC whose CCTrCH is a non-real time CCTrCH.

3. The technique of claim 2 further comprising advising a medium access control (MAC) that one TFC is blocked;

said MAC notifying a codec associated with the TFC whose estimated power is less than said threshold to reduce the data rate when applicable.

4. A dynamic link adaptation technique employed in a cellular system by a user equipment (UE) having two coded composite transport channels (CCTrCHs) in an uplink time slot, comprising:

estimating transmit power using a transport format combination (TFC) pair for the CCTrCHs;

comparing total estimated transmit power for two CCTrCHs with a given threshold;

permitting use of both TFCs when the total estimated power is less than the threshold;

comparing the estimated power of each TFC with said threshold;

determining if the CCTrCHs are of a same traffic class when each of the TFCs is less than said threshold; and choosing a TFC to block based on given criteria.

5. The technique of claim 4 further comprising advising a medium access control (MAC) that one TFC is blocked;

said MAC notifying a codec associated with the TFC whose estimated power is less than said threshold to reduce the data rate when applicable.

6. The technique of claim 4 wherein choosing a TFC to block based on certain criteria includes:

blocking the TFC of the CCTrCH which required higher transmit power.

7. The technique of claim 6 further comprising advising a medium access control (MAC) that one TFC is blocked;

said MAC notifying a codec associated with the TFC whose estimated power is less than said threshold to reduce the data rate when applicable.

8. The technique of claim 4 wherein choosing a TFC to block based on certain criteria includes:

blocking the TFC of the CCTrCH which required lower transmit power.

9. The technique of claim 8 further comprising advising a medium access control (MAC) that one TFC is blocked;

said MAC notifying a codec associated with the TFC whose estimated power is less than said threshold to reduce the data rate when applicable.

10. The technique of claim 4 wherein choosing a TFC to block based on certain criteria includes:

blocking the TFC that will cause the lowest rate reduction in the corresponding CCTrCH if blocked.

11. The technique of claim 10 further comprising advising a medium access control (MAC) that one TFC is blocked;

said MAC notifying a codec associated with the TFC whose estimated power is less than said threshold to reduce the data rate when applicable.

12. The technique of claim 4 wherein choosing a TFC to block based on certain criteria includes:

blocking the TFC that will yield lower throughput of high priority data.

13. The technique of claim 12 further comprising advising a medium access control (MAC) that one TFC is blocked;

said MAC notifying a codec associated with the TFC whose estimated power is less than said threshold to reduce the data rate when applicable.

14. A dynamic link adaptation apparatus for use in a cellular system by a user equipment (UE) having two coded composite transport channels (CCTrCHs) in an uplink time slot, comprising:

means for estimating transmit power using a transport format combination (TFC) pair for the CCTrCHs;

means for comparing total estimated transmit power for two CCTrCHs with a given threshold;

means for permitting use of both TFCs when the total estimated power is less than the threshold;

means for comparing a power of each TFC with said threshold;

means for blocking the TFC whose estimated power is greater than said threshold;

means for advising a medium access control (MAC) that one TFC is blocked; and said MAC having means for notifying a codec associated with the TFC whose estimated power is less than said threshold to reduce the data rate when applicable.

15. A dynamic link adaptation apparatus for use in a cellular system by a user equipment (UE) having two coded composite transport channels (CCTrCHs) in an uplink time slot, comprising:

means for estimating transmit power using a transport format combination (TFC) pair for the CCTrCHs;

means for comparing total estimated transmit power for two CCTrCHs with a given threshold;

means for permitting use of both TFCs when the total estimated power is less than the threshold;

means for comparing the estimated power of each TFC with said threshold;

means for determining if the CCTrCHs are of a same traffic class when each of the TFCs is less than said threshold; and means for blocking the TFC whose CCTrCH is a non-real time CCTrCH.

16. The apparatus of claim 15 further comprising means for advising a medium access control (MAC) that one TFC is blocked; and said MAC having means for notifying a codec associated with the TFC whose estimated power is less than said threshold to reduce the data rate when applicable.

17. A dynamic link adaptation apparatus for use in a cellular system by a user equipment (UE) having two coded composite transport channels (CCTrCHs) in an uplink time slot, comprising:

means for estimating transmit power using a transport format combination (TFC) pair for the CCTrCHs;

means for comparing total estimated transmit power for two CCTrCHs with a given threshold;

means for permitting use of both TFCs when the total estimated power is less than the threshold;

means for comparing the estimated power of each TFC with said threshold;

means for determining if the CCTrCHs are of a same traffic class when each of the TFCs is less than said threshold; and means for choosing a TFC to block based on given criteria.

18. The apparatus of claim 17 further comprising means for advising a medium access control (MAC) that one TFC is blocked; and said MAC having means for notifying a codec associated with the TFC whose estimated power is less than said threshold to reduce the data rate when applicable.

19. The apparatus of claim 17 wherein said means for choosing a TFC to block based on certain criteria includes:

means to block the TFC of the CCTrCH which required higher transmit power.

20. The apparatus of claim 19 further comprising means for advising a medium access control (MAC) that one TFC is blocked; and said MAC having means for notifying a codec associated with the TFC whose estimated power is less than said threshold to reduce the data rate when applicable.

21. The apparatus of claim 17 wherein said means for choosing a TFC to block based on certain criteria includes:

means to block the TFC of the CCTrCH which required lower transmit power.

22. The apparatus of claim 21 further comprising means for advising a medium access control (MAC) that one TFC is blocked; and said MAC having means for notifying a codec associated with the TFC whose estimated power is less than said threshold to reduce the data rate when applicable.

23. The apparatus of claim 17 wherein said means for choosing a TFC to block based on certain criteria includes:

means for blocking the TFC that will cause the lowest rate reduction in the corresponding CCTrCH if blocked.

24. The apparatus of claim 23 further comprising means for advising a medium access control (MAC) that one TFC is blocked; and said MAC having means for notifying a codec associated with the TFC whose estimated power is less than said threshold to reduce the data rate when applicable.

25. The apparatus of claim 17 wherein said means for choosing a TFC to block based on certain criteria includes:

means for blocking the TFC that will yield lower throughput of high priority data.

26. The apparatus of claim 25 further comprising means for advising a medium access control (MAC) that one TFC is blocked; and said MAC having means for notifying a codec associated with the TFC whose estimated power is less than said threshold to reduce the data rate when applicable.

* * * * *